United States Patent [19]

Mori et al.

[11] Patent Number: 5,450,567
[45] Date of Patent: Sep. 12, 1995

[54] METHOD AND SYSTEM FOR PROGRAM CHANGE IN DISTRIBUTED DATA PROCESSING SYSTEM

[75] Inventors: Kinji Mori; Yasuo Suzuki, Ebina; Tsunao Kanzaki, Kawasaki; Hiroaki Fujii, Toyonaka, all of Japan

[73] Assignees: Hitachi, Ltd.; Hitachi Microcomputer System Ltd., both of Tokyo, Japan

[21] Appl. No.: 645,099

[22] Filed: Jan. 24, 1991

[30] Foreign Application Priority Data

Feb. 5, 1990 [JP] Japan .................... 2-024546

[51] Int. Cl.⁶ ............... G06F 11/16; G06F 15/177
[52] U.S. Cl. .................... 395/500; 395/700; 364/DIG. 1; 364/280.2; 364/280.6; 364/281.6; 364/281.9; 364/285.3
[58] Field of Search .......... 364/DIG. 1 MS File, 364/DIG. 2 MS File; 395/200, 500, 650, 700

[56] References Cited

U.S. PATENT DOCUMENTS

| | | | |
|---|---|---|---|
| 4,780,821 | 10/1988 | Crossley | 395/650 |
| 4,855,905 | 8/1989 | Estrada et al. | 395/500 |
| 4,858,114 | 8/1989 | Heath et al. | 395/775 |
| 4,970,639 | 11/1990 | Diefendorf et al. | 395/700 |
| 4,979,106 | 12/1990 | Schneider | 395/700 |
| 5,067,072 | 11/1991 | Talati et al. | 395/650 |
| 5,097,533 | 3/1992 | Burger et al. | 395/500 |
| 5,109,484 | 4/1992 | Hughes et al. | 395/200 |
| 5,247,678 | 9/1993 | Littleton et al. | 395/700 |
| 5,261,095 | 11/1993 | Crawford et al. | 395/650 |

Primary Examiner—Thomas G. Black
Assistant Examiner—John C. Loomis
Attorney, Agent, or Firm—Fay, Sharpe, Beall, Fagan, Minnich & McKee

[57] ABSTRACT

In a multi-processor system having a plurality of processors connected to each other through a network, a method of executing a program under various environments, includes the steps of transmitting the program from a first processor to a second processor, the first and second processors being included in the plurality of processors, autonomously checking by the second processor whether or not an executing environment set in the program matches to an actual executing environment, autonomously changing the program by the second processor in accordance with the checking result, and executing the changed program by the second processor.

21 Claims, 13 Drawing Sheets

FIG. 6

|  | CPU 1 | CPU 2 | CPU 3 | CPU 4 |
|---|---|---|---|---|
| C R T |  | s |  |  |
| KEYBOARD |  | r |  |  |
| PRINTER |  |  | s |  |
| FILE | r/s |  |  |  |

FIG. 11

| USING ORDER FOR INPUT | 1 | rcv | Keyboard | msg |
|---|---|---|---|---|
| | 2 | | File | |
| | 3 | | PI/O | |
| | 4 | | network | |

| USING ORDER FOR OUTPUT | 1 | snd | CRT | msg |
|---|---|---|---|---|
| | 2 | | PRINTER | |
| | 3 | | File | |
| | 4 | | PI/O | |
| | 5 | | network | |

METHOD AND SYSTEM FOR PROGRAM CHANGE IN DISTRIBUTED DATA PROCESSING SYSTEM

BACKGROUND OF THE INVENTION

1. Field of the Invention

The present invention relates to a method of program change for development, test and execution of a program in a distributed data processing system.

2. Description of the Related Art

In a conventional distributed data processing system having a plurality of processors connected through a network with each other, only a program adaptable for the environment of a processor is fetched into the processor and executed. However, there has been no method of changing and executing a program in accordance with the processor environment.

In a structure of such a conventional program, a program processing section is not separated from input-/output sections. Therefore, in a case where an input or output terminal corresponding to the input or output section does not exist in the environment of the processor, a user must change the program based on the processor environment.

SUMMARY OF THE INVENTION

An object of the present invention is to provide a method of changing a program, in which each processor fetches a program therein and autonomously changes the program to be adaptable for its environment, and a system therefor.

Another object of the present invention is to provide a method of, when a fault has occurred in a processor, autonomously changing a program to be adaptable for a new environment and a system therefor.

A further object of the present invention is to provide a method of autonomously changing a program to be adaptable for an environment prevailing at the time of fault which may arise in the processor.

Still another object of the present invention is to provide a method of autonomously changing a program to be adaptable for a new environment when capability of the processor is expanded.

A still further object of the invention is to provide a method of changing a program in which each processor autonomously changes a program in accordance with the environment of the processor.

Still another object of the present invention is to provide a method of autonomously changing a program executed under a different environment in accordance with the required capacity and performance of the program to be adaptable for the environment of a processor.

In order to achieve the above-mentioned objects, a method of executing a program under various environments, in a multi-processor system having a plurality of processors connected to each other through a network, comprising the steps of:

transmitting the program from a first processor to a second processor, the first and second processors being included in the plurality of processors;

autonomously checking by the second processor whether or not an executing environment set in the program matches to an actual executing environment (of that processor);

autonomously changing the program by the second processor in accordance with the checking result; and executing the changed program by the second processor.

As described above, according to the present invention, there is provided a method of autonomous program change, in which each processor is constructed so as to change a program to be adaptable for an environment thereof. Therefore, each processor can autonomously cope with change in the processor environment due to fault of its terminal or system expansion for program execution.

BRIEF DESCRIPTION OF THE DRAWINGS

FIG. 6 is a diagram showing a remote I/O table.

FIG. 11 is a diagram showing a using order table;

DESCRIPTION OF THE PREFERRED EMBODIMENTS

An embodiment of the present invention will be explained below with reference to the accompanying drawings.

Figure 2:
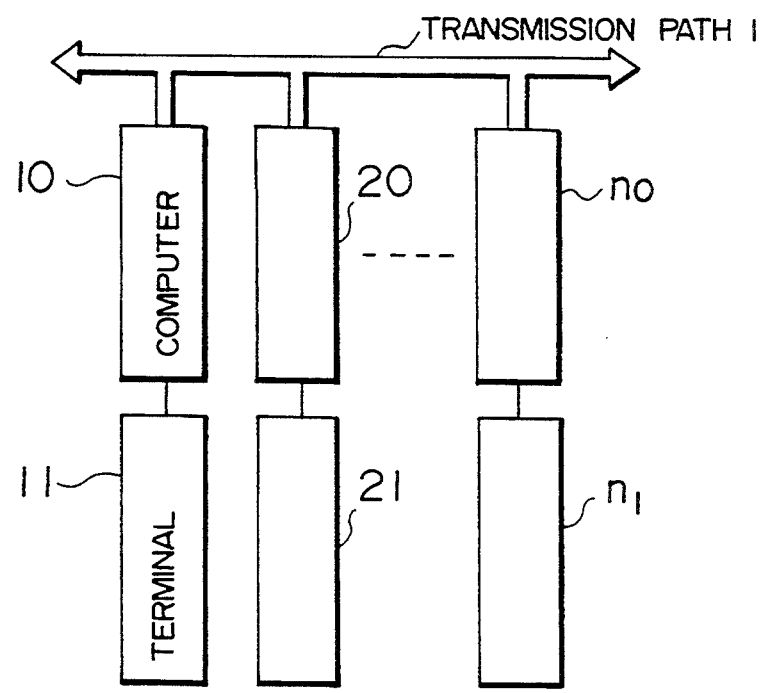
FIG. 2 is a block diagram showing a general configuration of the multicomputer system to which the present invention is applied.

FIG. 2 is a diagram showing a configuration of a multicomputer system according to the present invention. Computers 10, 20, . . . n0 are connected to each other via a transmission path 1 to transfer data and a program. Each computer includes an operation processor and a memory for accumulating the data and program, and the computers are connected to a terminal 11, 21, . . . , n1, respectively.

Figure 1:
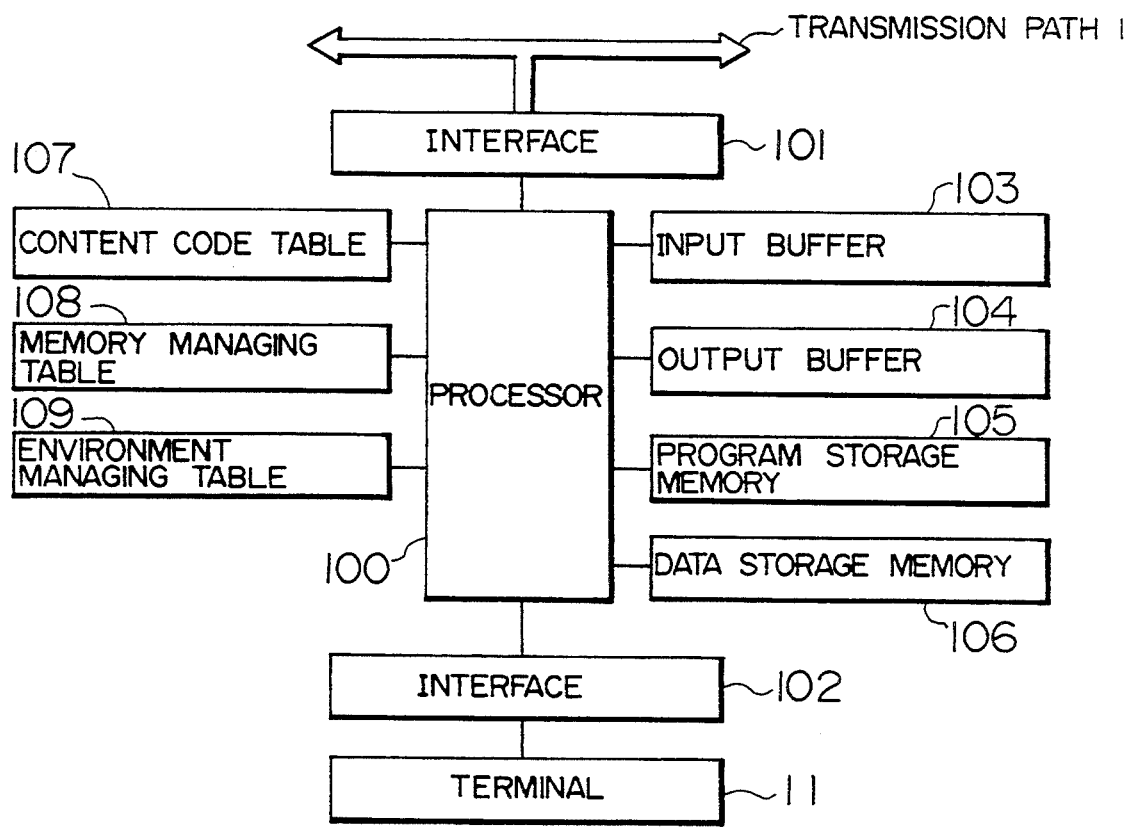
FIG. 1 is a block diagram showing a configuration of a computer used in a multicomputer system to which the present invention is applied.

A typical configuration of the computer 10 is shown in FIG. 1. A processor (CPU) 100 is connected to the transmission path 1 via an interface 101 and to the terminal 11 through an interface 102. The processor 100 is also connected to an input buffer 103, an output buffer 104, a program storage memory 105, a data storage memory 106, a content code table 107, a memory managing table 108 and an environment managing table 109. A program which is executed by the computer is set appropriately in advance by a user through the terminal 11, or transmitted from another computer.

Figure 3:
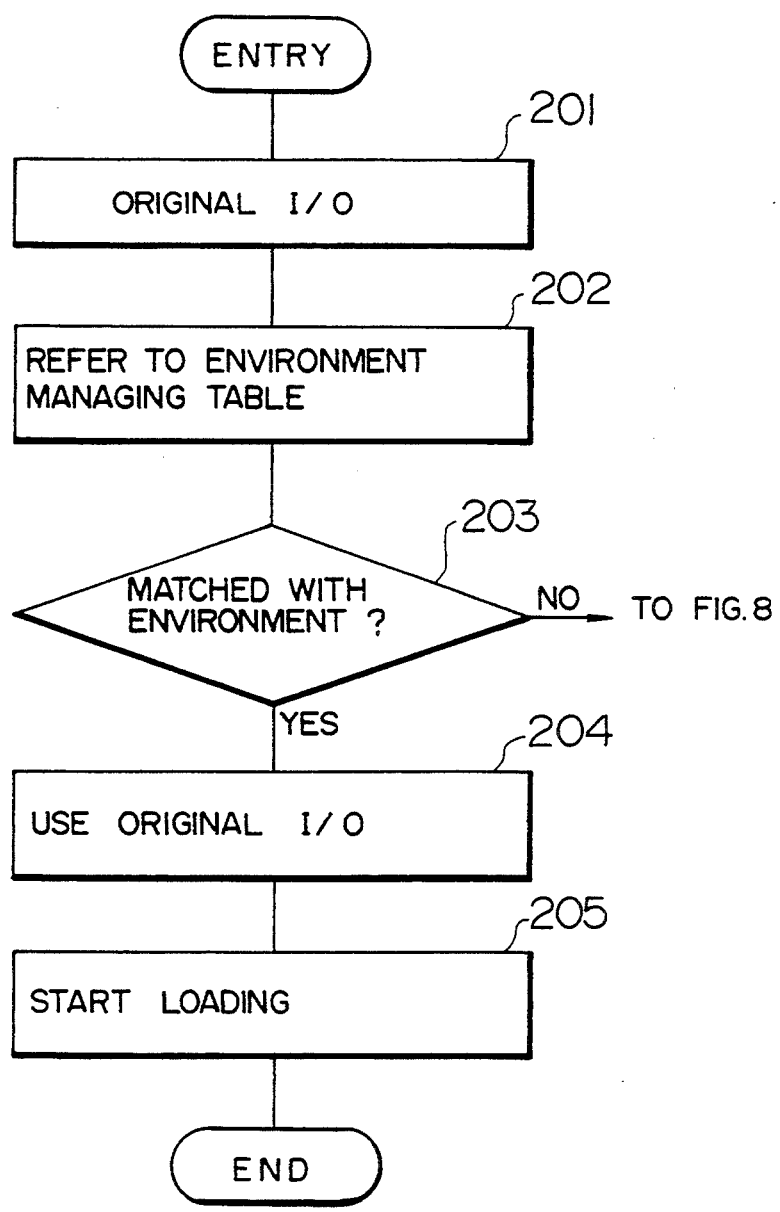
FIG. 3 is a flowchart for explaining an operation when a processor executes a program received from another processor.
Figure 4:
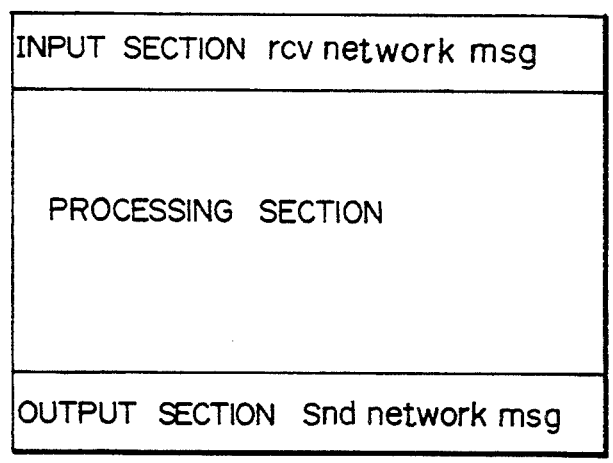
FIG. 4 is a diagram showing a program format.
Figure 5:
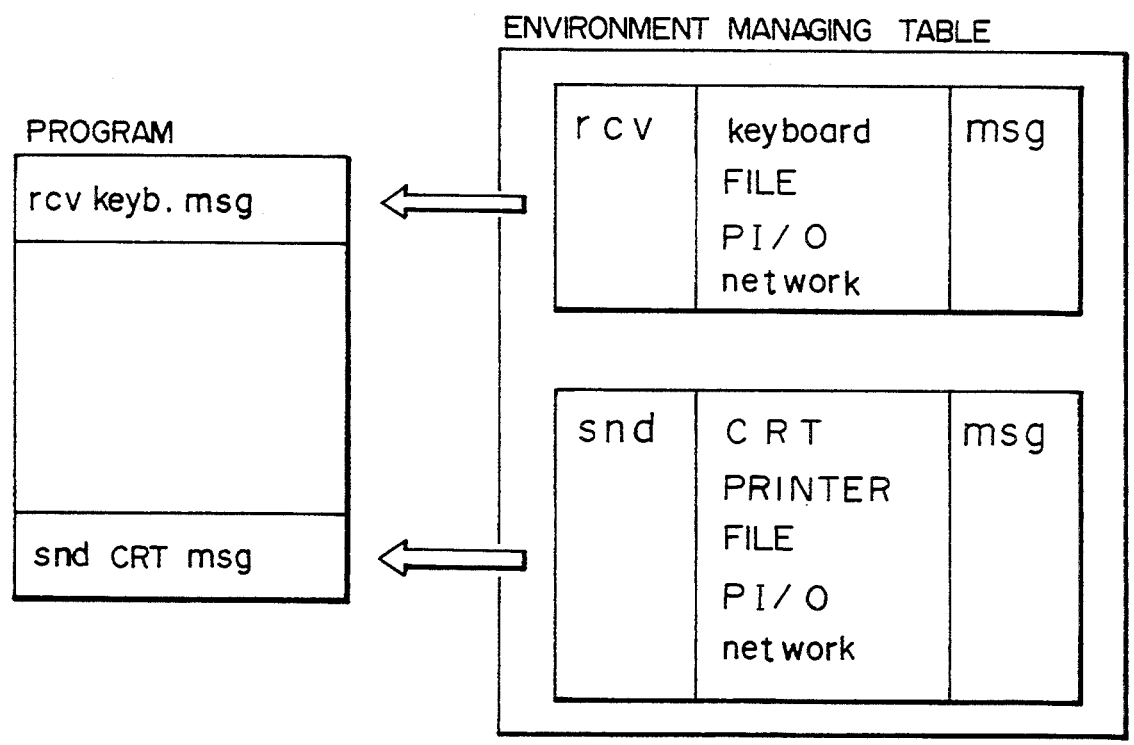
FIG. 5 is a diagram showing an environment managing table.

FIG. 3 shows a flowchart for explaining an operation for executing the program which is executed by another processor by the CPU 100. The program having a format shown in FIG. 4 is assumed to be executed. The program is comprised of an input section (rcv network msg), a processing section and an output section (snd network msg). In the CPU 100 for executing the program an environment managing table shown in FIG. 5 is set in advance. In the environment managing table, I/O sections are set as shown in FIG. 5 when there are an input environment such as a keyboard, a file, PI/O and a network and an output environment such as a CRT, a printer, a file, a PI/O and a network.

Now, the flowchart of FIG. 3 will be explained in detail. First, when the CPU 100 receives at a step 201 a program which is developed for an environment different from that of the CPU 100, the CPU 100 checks original I/O sections of the program. The CPU 100 checks the I/O sections of its environment by reference to the environment managing table shown in FIG. 5 at a step 202. At a step 203, matching between the original I/O sections and the I/O sections under the CPU environment is compared.

In FIG. 5, there are an input section (rcv keyboard msg) in an input environment of the environment managing table and an output section (snd CRT msg) in an output environment thereof while the input section of the received program has (rcv keyboard msg) and the output section thereof (snd CRT msg), so that it can be understood that there is the matching under the current condition. At a step 204, the CPU 100 that has confirmed the matching between the original I/O sections and the I/O sections under the current condition at the step 203 determines to use the original I/O sections. At step 205, the CPU 100 starts loading and executing the program having the original I/O sections.

Now, explanation will be made about a case that the matching with the current condition cannot be obtained at the step 203 of FIG. 3.

FIG. 6 shows an example of a remote I/O table generated by the CPU 100 when there is no matching between the environment of the CPU 100 and that for the program original I/O sections. In this diagram, characters r and s denote the input section (rcv) and the output section (snd), respectively.

Figure 7:
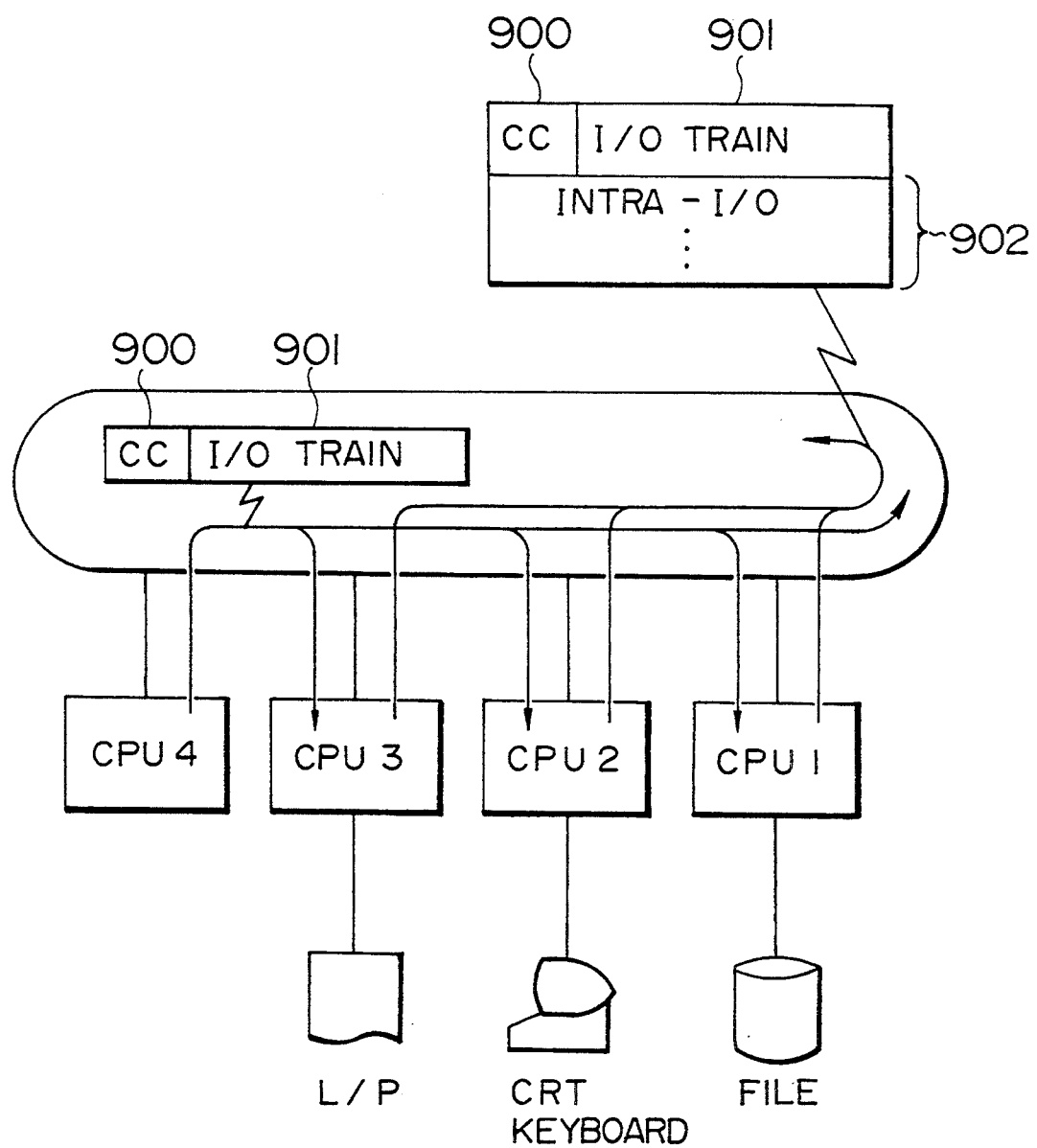
FIG. 7 is a diagram showing an operation for generating the remote I/O table.

FIG. 7 is a diagram showing an operation of generating the remote I/O table of FIG. 6. Assume that four CPUs (CPU 1 to CPU 4) are connected to each other by a network. The CPU 4 has no I/O unit, and in order to execute a program by the CPU 4, therefore, it would be necessary to utilize the I/O units of other CPUs (CPU 1 to CPU 3). In this case, the CPU 4 transmits onto the network an I/O train 901 with content codes 900 of the program to be executed. Each CPU (CPU 1 to CPU 3) concatenates a message relating to their intra-I/O units to the I/O train 901. When the I/O train 901 is circulated through the network, the messages relating to the I/O units of each CPU (CPU 1 to CPU 3) can be obtained by the CPU 4. The CPU 4 recognizes from the messages 902 of the I/O train the fact that the CPU 1 is connected to a file, the CPU 2 to a CRT and keyboard, the CPU 3 to a line printer (L/P). The CPU 4 generates internally the remote I/O table, shown in FIG. 6, based on the messages 902. Thus, the remote I/O table of FIG. 6 as mentioned above generated through the above-mentioned operation manages the information associated with the I/O units connected to each CPU.

Figure 8:
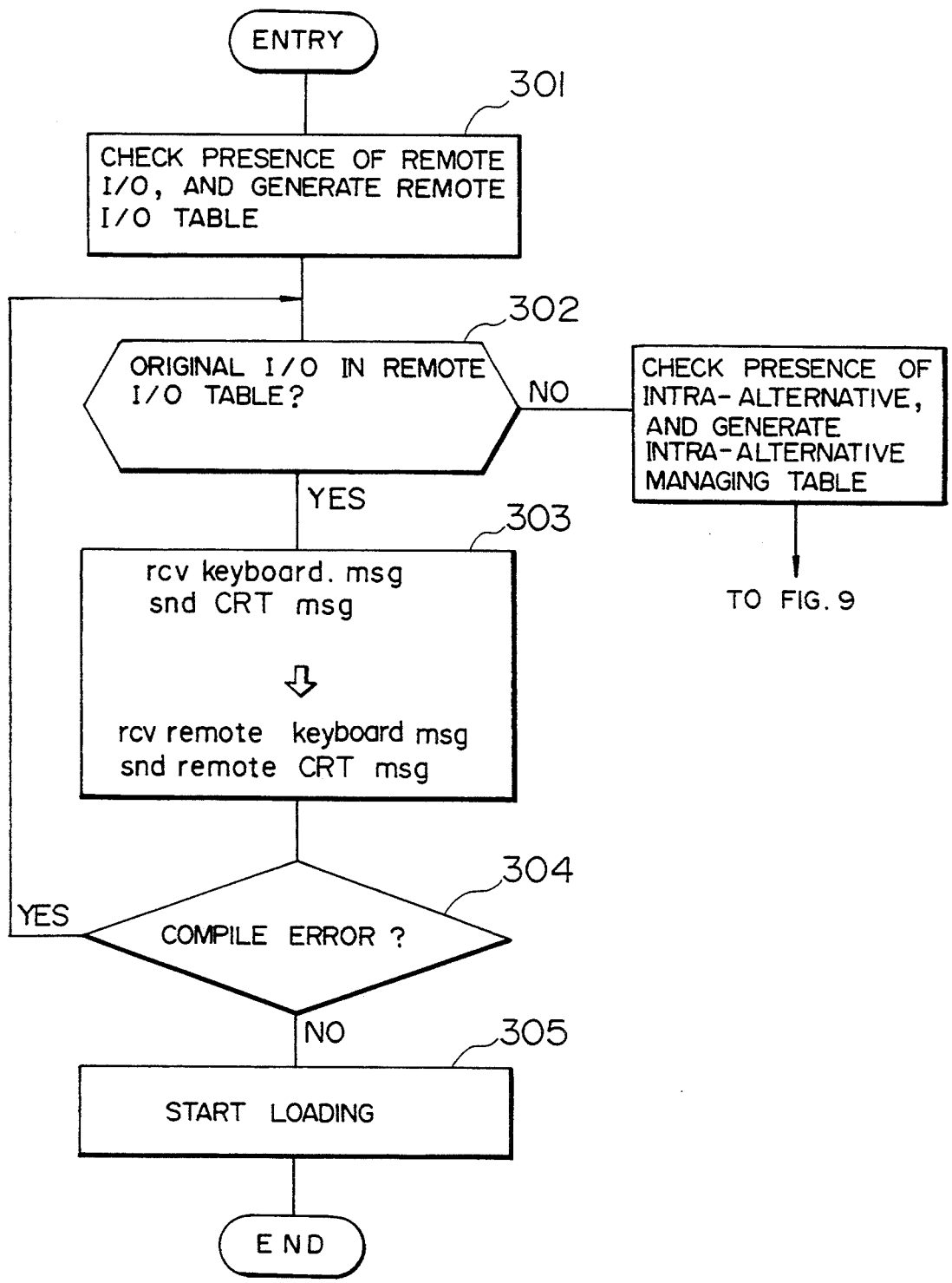
FIG. 8 is a flowchart for explaining an operation when an original I/O of a program is converted into a remote I/O.

FIG. 8 shows a flowchart for explaining an operation when the CPU 100 executes the program in which the original I/O sections of the program are replaced by the remote I/O sections. When the CPU 100 for executing the program determines that the current environment of the CPU does not match the original I/O sections of the program, the CPU 100 transmits an I/O train onto the network 1, at a step 301 to obtain messages relating to the I/O units of other CPUs. Then the CPU 100 generates a remote I/O table of the same type as in FIG. 6 therein. At a step 302, it is checked whether or not the I/O units corresponding to the original I/O sections exist in the remote I/O table. If it is determined at the step 302 that the program original I/O sections are available by the remote I/O units, the CPU 100 changes the program original I/O sections into remote I/O sections corresponding to the remote I/O units at a step 303. At this time, the program original input section (rcv keyboard msg) and the output section (snd network msg) are converted into the remote I/O section for a CRT (snd remote CRT msg) of another CPU and the keyboard (rec remote keyboard msg) of another CPU. Next, at a step 304 the program in which the original I/O sections are converted into the remote I/O sections is compiled. When a compiling error occurs due to the I/O section conversion, the remote I/O sections need to be determined again for the program to be executed. In such a case, with the occurrence of the compiling error, the operation is returned to the step 302 for re-determination of the remote I/O sections. Then, the program is compiled again at the step 304. If there occurs no compile error, step 305 is executed to start loading and executing the compiled program.

As described above, when the program original I/O sections fail to match with the current environment of the CPU by which the program is executed, the CPU generates the remote I/O table therein from the information, relating to other I/O units, obtained by transmitting the I/O train 901 with the content codes 900 of the program to other CPUs. Based on this remote I/O table, the original I/O sections are converted into the remote I/O sections such that the program can be executed.

Figure 9:
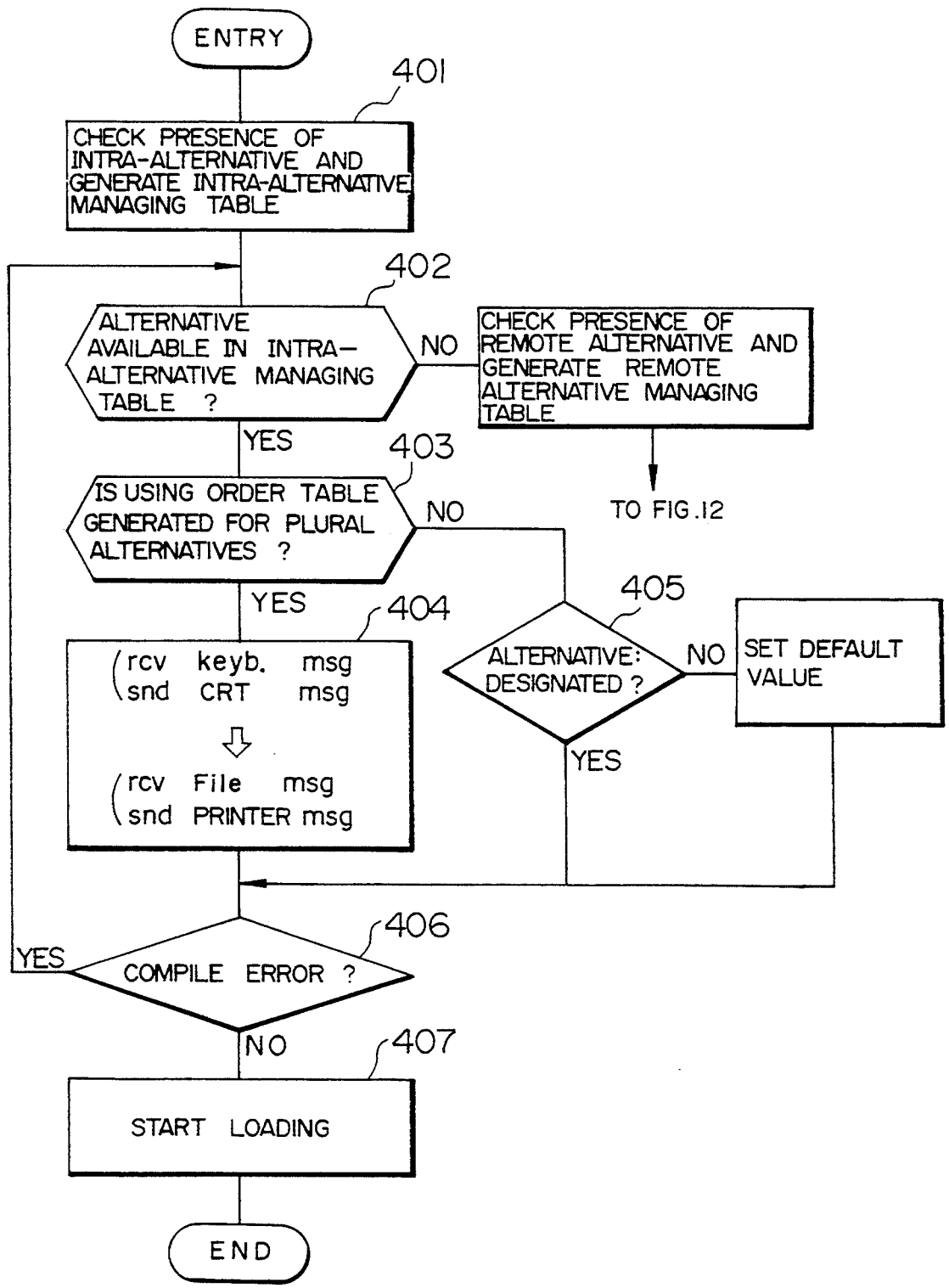
FIG. 9 is a flowchart for explaining an operation using an intra-alternative.
Figure 10:
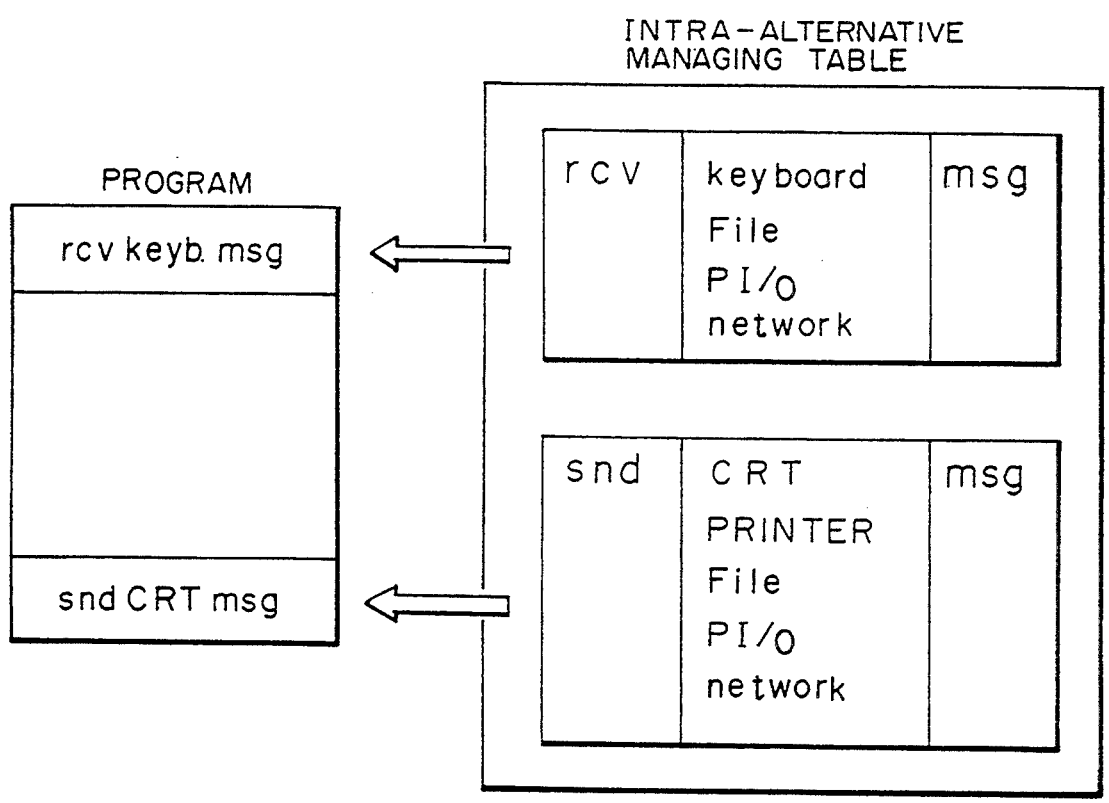
FIG. 10 is a diagram showing an intra-alternative managing table.

Now, explanation will be made about a case where I/O units corresponding to the original I/O sections cannot be found in the remote I/O table. In this case, the CPU 100 checks whether or not there are intra-alternative I/O units therein. FIG. 9 shows a flowchart for explaining an operation for acquiring an intra-alternative.

When the CPU 100 determines at a step 302 of FIG. 8 the absence of I/O units corresponding to program original I/O sections in its remote I/O table, in order to check whether or not intra-alternative I/O units exist, an intra-alternative managing table is generated at a step 401 of FIG. 9. In a case that a keyboard, a file, a PI/O and a network are registered as input units in the intra-alternative managing table and a CRT, a printer, a PI/O and a network are registered as output units, the I/O sections can be set. When it is determined from the intra-alternative managing table at the step 402 that there are intra-alternative I/O units, the CPU executes a step 404. In a case where the original input section of the program is the keyboard (rcv keyboard msg), and the output section thereof a CRT (snd CRT msg), for example, the file (rcv file msg) and a printer (snd PRINTER msg) are used as the alternatives for the original input and output sections, respectively. When there are a plurality of I/O alternatives, a using order table is generated at a step 403, as shown in FIG. 11.

If there are present in the CPU input alternatives such as keyboard, file, PI/O and network, they are determined in that order as the alternative for the original input section. Instead, as shown in a step 405, an available alternative may be determined by inquiring an alternative to be used to a user. In this case, a default value may be designated.

At a step 406 the program in which the original I/O sections are replaced by the determined alternatives is re-compiled. If a compile error occurs, new alternatives must be re-determined for execution of the program. In such a case, upon occurrence of the compile error, the operation is returned to the step 402 to thereby re-determine new remote I/O alternatives. If there occurs no compile error after compilation at step 406, the program is loaded and started at a step 407. As described above, in a case where the original I/O sections of the program fails to match the environment of the CPU, the CPU executes the program by converting the program original I/O sections into those for its intra-alternative I/O units.

Now, explanation will be made about a remote alternative in a case where no I/O units acting as an alternative of the program original I/O section is present in an environment of the CPU 100.

Figure 12:
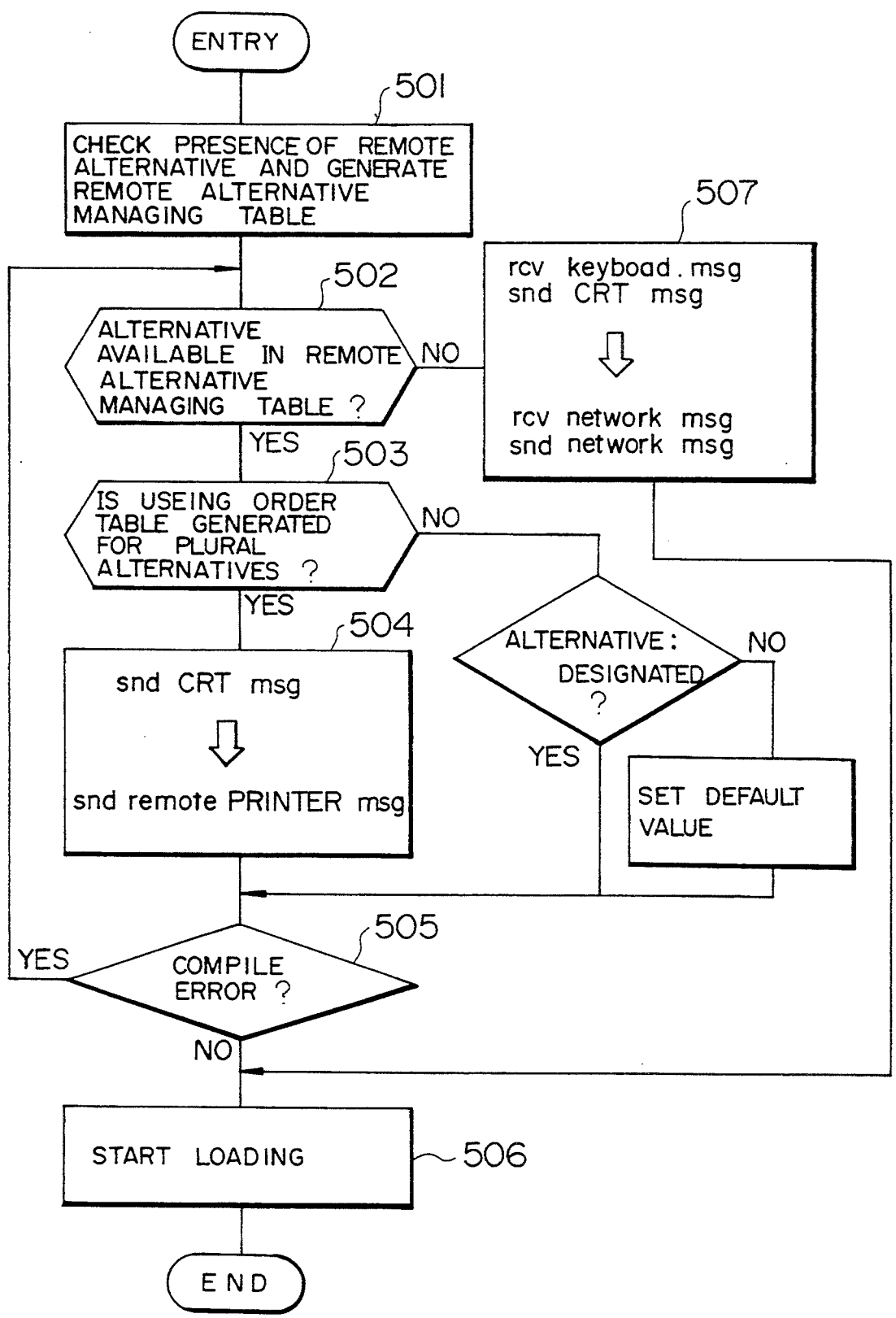
FIG. 12 is a flowchart for explaining an operation using a remote alternative.

FIG. 12 shows a flowchart for explaining an operation for acquiring remote alternatives. Assuming that at the step 402 in FIG. 9 I/O units corresponding to the program original I/O sections are not present in the intra-alternative table, the CPU 100 generates a remote alternative managing table as shown in FIG. 13, in order to check at a step 501 of FIG. 12 whether or not the I/O units in the remote alternative managing table are available.

Figure 13:
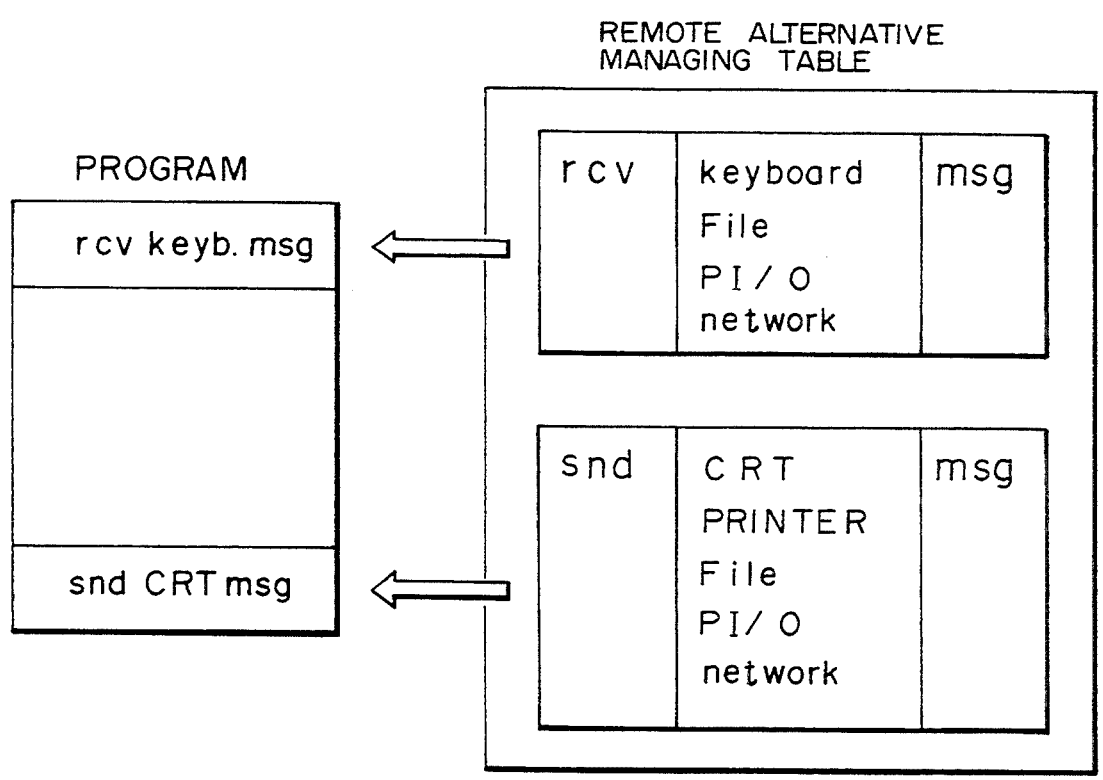
FIG. 13 is a diagram showing a remote alternative managing table.
Figure 14:
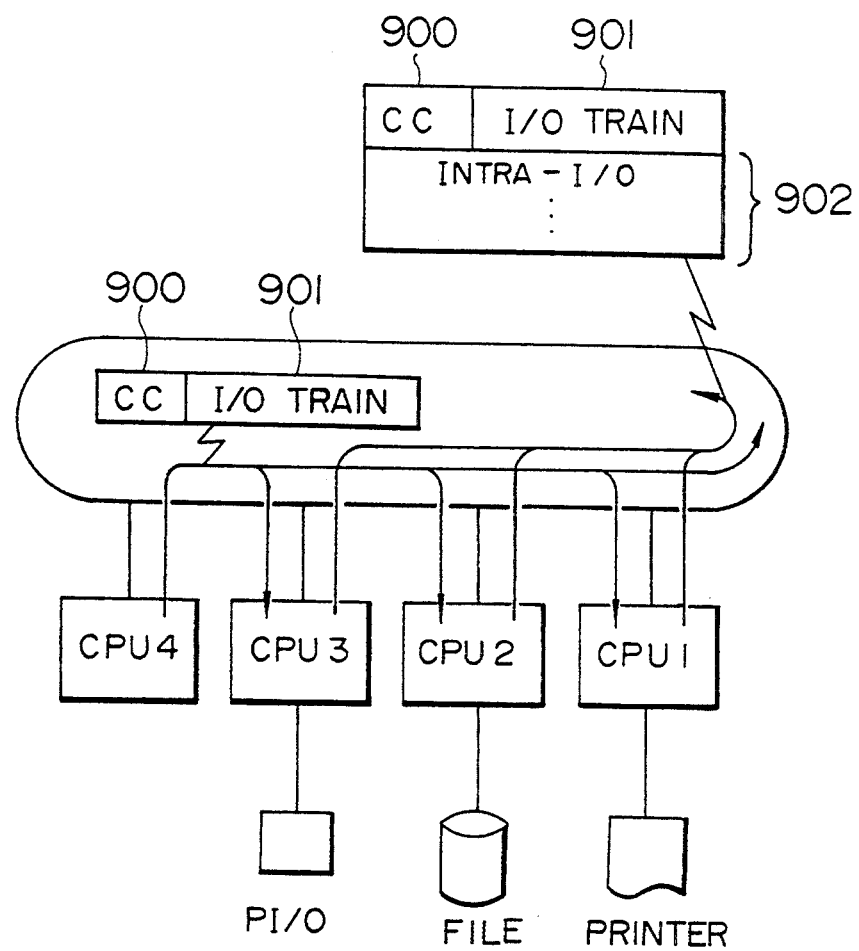
FIG. 14 is a diagram showing an operation when the remote alternative managing table is generated.

FIG. 14 is a diagram showing an operation of generating a remote alternative managing table shown in FIG. 13. Assume in this example that four CPUs (CPU 1 to CPU 4) are connected to each other via a network. The CPU 4 has no I/O unit, as shown in FIG. 13. In the case of executing a program having a section (rcv keyboard msg) as the input section and a section (snd CRT msg) as the output section, it is necessary to utilize the I/O units of the other CPUs (CPU 1 to CPU 3). In this case, in order to find an output unit corresponding to a program original output section, the CPU 4 transmits on the network an I/O train 901 with content codes 900 of the program to be executed. Each CPU (CPU 1 to CPU 3) sequentially concatenates the message relating to its remote alternatives to this I/O train 901. The I/O train 901, after making a round of the network, is transferred to the CPU 4. The CPU 4 recognizes from the messages 902 to the I/O train 901 that the CPU 1 is connected to the printer, the CPU 2 to the file, and the CPU 3 to PI/O. The CPU 4 generates the remote alternative managing table from these messages 902, as shown in FIG. 13. The remote alternative managing table is used to manage the information relating to the alternative I/O units of each CPU.

If at a step 502 of FIG. 12 there are remote alternatives for the original I/O sections of the program in the remote alternative managing table, the operation advances to a step 504, where the original output section (snd CRT msg) of the program is converted into or replaced by a remote alternative output (snd PRINTER msg). In a case where there are a plurality of remote input-output alternatives, a possible remote alternative may be determined in accordance with a using order table having the same form as shown in FIG. 11, which is generated at a step 503, or in accordance with designation by a user. In a latter case, unless an alternative is not designated, a default one is set. Once an alternative is determined in this manner, the converted program is compiled at a step 505. In a case where a compile error occurs during the compilation, re-determination of the remote alternative is required for execution of the program. In such a case, upon occurrence of the compile error, the operation is returned to the step 502 to re-determine the remote alternative I/O section. Then at the step 505 the compilation is performed again. Unless any compile error occurs, step 506 is executed to start loading and executing the program. In the manner mentioned above, the original I/O sections of a program are converted into remote alternative I/O sections by a CPU other than a particular one which has executed the program. Also, even in a case where no alternative corresponding to original I/O sections of the program is present in any CPU on the network, the program can be executed by converting the original input section into a section (rcv network msg) and the original output section into a section (snd network msg), i.e., by utilizing the network.

Figure 15:
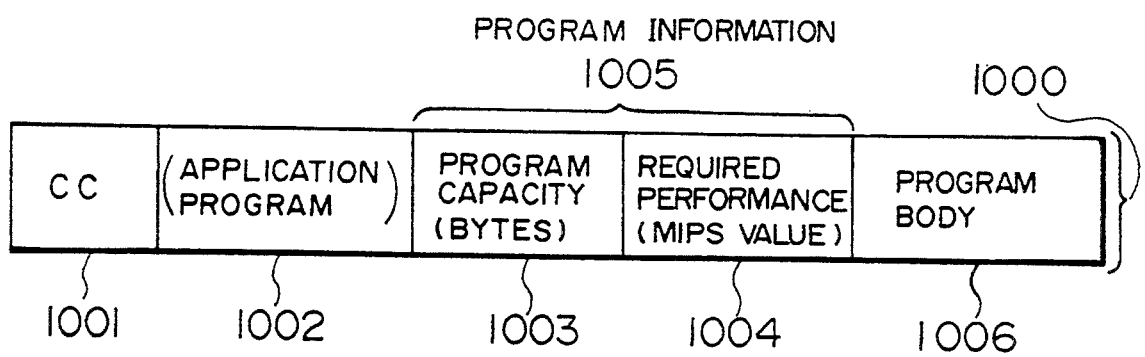
FIG. 15 is a diagram showing a format of program information.

The compilation and loading of a program are effected taking the following facts into consideration:

A format of the program is shown in FIG. 15. The program 1000 includes content codes 1001, an application program 1002, program capacity 1003 (in bytes), required performance 1004 (MIPS value) and a program body 1006. The capacity 1003 and performance 1004 are called a program information 1005.

Figure 16:
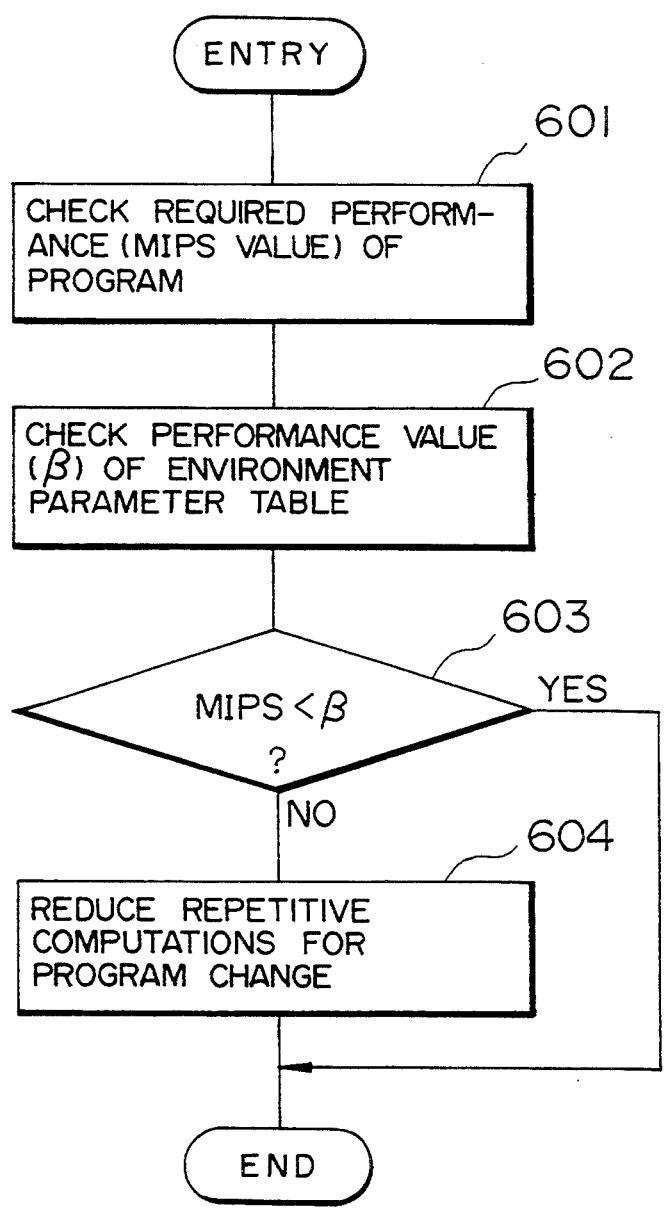
FIG. 16 is a flowchart for explaining an operation when a program is compiled.

FIG. 16 shows a flowchart for explaining an operation on for evaluation in compiling the program 1000. From FIG. 15, the program 1000 has data as program information 1005 containing the performance required thereby. The MIPS value, for example, is used for the required performance 1004. Step 601 is executed to check the required performance (MIPS value) of the program 1000. The CPU is assumed to have a performance value in an environment parameter table therefor. Step 602 is executed to check the performance value (which is assumed to be $\beta$ here) of this environment parameter table. Step 603 is executed to compare the environment performance value $\beta$ of the CPU with the required performance (MIPS value) 1004. If the required performance (MIPS) of the program is smaller than the performance value ($\beta$), the program is compiled as it is. Otherwise, step 604 is executed to change the program 1000. In this case, the number of the repetitive computations in the program 1000 is reduced in accordance with (1) a ratio of the MIPS value shown in FIG. 15, or (2) by a predetermined ratio, thereby matching the required performance 1004 of the program 1000 with an environment of the CPU execution of program.

Now, the program loading will be explained with reference to FIG. 15. It is seen from FIG. 15 that the program 1000 has data containing a program capacity (bytes) as the program information 1005. If this capacity is smaller than a predetermined capacity of the environment parameter table of the CPU, the program is maintained in a core memory. If the program capacity 1003 is larger than the predetermined capacity, on the other hand, the program is stored in a disk without being maintained in the core memory). Specifically, in the former case the program is stored in a regular area, and in the latter case in an irregular area.

As described above, the CPU autonomously compiles and loads the program executed under another environment and received from another CPU, in accordance with the required capacity or performance to be adaptable for its environment.

According to this embodiment, (1) each processor checks a program stored in the processor, and autonomously changes the program in accordance with its environment to be adaptable for its environment, (2) each processor autonomously changes a program to be adaptable for its environment upon occurrence of a fault in a processor system, (3) each processor changes a program to be adaptable for its expanded environment, upon expansion of a processor system, and (4) each processor is capable of operation by changing a program in its own system to the executable one corresponding to its particular environment. Also, each processor is capable of independently coping with an excessive load or shortage of load.

According to the present invention, each CPU changes a program existing therein in such a manner as to have input-output sections corresponding to the environment of the CPU. Therefore, the program may be executed without regard to the environment of each CPU. Also, each CPU is capable of operating a program by changing the program stored therein to the one independently adaptable for fault of its environment or expansion thereof. Further, the program received by each CPU from another CPU may be autonomously compiled and loaded in accordance with its environment, i.e., in accordance with the required capacity or the required performance.

What is claimed is:

1. In a multi-processor system having a plurality of processors connected to each other through a network, a method of executing an original program under various environments, comprising the steps of:
    starting to execute the original program in a first processor;
    transmitting the original program from the first processor to a second processor when the original program cannot be fully executed in the first processor, the first and second processors being included in the plurality of processors;
    autonomously checking by the second processor whether or not an executing environment set in the original program matches to an actual executing environment of the second processor;
    autonomously changing the original program by the second processor when the checking indicates either an actual or an alternative match to the execution environment set in the original program to compile a changed program such that the changed program is executable in the executing environment of the second processor; and
    loading and executing the changed program by the second processor.

2. The method according to claim 1, wherein said changing step includes the step of changing the original program by the second processor to be adaptable for executing in an input/output environment of the second processor as an actual input/output executing environment.

3. The method according to claim 1, wherein said changing step includes the step of changing the original program to utilize an alternative environment of the second processor as the executing environment when it is determined that the executing environment set in the original program is not present in the multi-processor system.

4. The method according to claim 1, wherein said changing step includes the step of changing the original program, to utilize an alternative input/output environment of another processor of the plurality of processors as an executing input/output environment when it is determined that an input/output executing environment set in the original program is not present in the multi-processor system.

5. The method according to claim 1, wherein said changing step includes the step of changing the original program in accordance with a processing capability required for the actual executing environment of the second processor wherein the original program is changeable without becoming inoperable.

6. In a data processing system having a plurality of processors, a method of executing a program under various environments, comprising the steps of:
    autonomously checking, when an environment of a processor is changed to become a changed environment in the executing of the program, whether or not an executing environment set in the program matches with the changed environment of the processor;
    autonomously changing the program in accordance with the checking result to compile a changed program having an intra-alternative environment that is executable in the changed environment of the processor; and
    executing the changed program by the processor.

7. The method according to claim 6, wherein said changing step includes the step of changing the program to utilize an input/output environment of the processor when it is determined that the set executing input/output environment is different from the changed environment of the processor.

8. The method according to claim 6, wherein said changing step includes the step of changing the program to utilize the changed environment of the processor when it is determined that the set executing environment is not present in the data processing system.

9. The method according to claim 6, wherein said changing step includes the step of changing the program to utilize an alternative input/output environment of the processor when it is determined that the set executing environment is not present in the data processing system.

10. The method according to claim 6, wherein the change in the executing environment of the processor comprises reducing the executing environment of the processor including reducing repetitive computations to match memory capabilities of the processor.

11. A method of executing a program in a multi-processor system including a plurality of processors connected to each other through a network, said method being executable in each of said plurality of processors and comprising the steps of:
    pre-storing environment information relating to input/output environments of said plurality of processors;

receiving in a first processor from said network an original program transmitted from another processor and having input and output sections;

checking said input and output sections of the original program and referring to said environment information for performing a first determination on whether or not said first processor has an input/output environment required for execution of the original program;

changing said input and output sections of the original program when the first determination is that an executing environment of the first processor comprises an actual match to the required input/output environment required for execution of the original program to generate a changed program comprising the original program compiled in an executable form for execution in the first processor; and loading and executing the changed program.

12. The method according to claim 11, further comprising the steps of:

when it is determined that the first processor does not have the actual match to the input/output environment required for execution of the original program, referring to said environment information of said another processor to perform a second determination on whether or not there is an alternative match to the input/output environment required for execution that is usable for said input section or output section of the original program; and determining the intra-alternative match to the input/output environment usable for said input section or output section of the original program in accordance with the second determination result, and wherein said changing step includes changing said input section or output section of the original program such that the intra-alternative match to input/output environment usable for said input section or said output section can be used.

13. The method according to claim 11 further comprising the steps of:

when it is determined that said first processor does not have the input/output environment required for execution of the original program, transmitting a message onto the network to acquire information relating to an input/output environment of an other processor in the multi-processor system;

receiving a response to the message from said other processor;

examining, based on the response, whether or not an other input/output environment of said other processor comprises a remote alternative match to the input and output sections of the original program; and performing a third determination to determine if the other input/output environment of said other processor is usable for said input section or output section of the original program in accordance with the examining result, and wherein said changing step includes changing said input and output sections of the original program to be alternatively executable as the remote alternative match to input and output sections of the original program based on the third determination.

14. The method according to claim 13 wherein said step of performing a third determination includes determining whether the input/output environment of said other processor is alternatively executable for said input and output sections of the original program when it is determined that the input/output environment of the other processor is not required for execution of the received program.

15. A distributed processing system comprising:

a plurality of processors connected to each other through a network, a particular processor of the plurality of processors comprising:

means for autonomously checking whether or not an executing environment set in an original program matches to an actual executing environment of the particular processor;

means for changing the program in accordance with the checking result to generate a changed program having an actual or an alternative match to the actual executing environment of the particular processor; and means for executing the changed program.

16. The distributed processing system according to claim 15, wherein a first processor comprises means for detecting that the original program executing environment cannot be executed therein and means for transmitting the original program to said particular processor, and means for said particular processor receiving the program.

17. The distributed processing system according to claim 15, wherein said means for changing includes means for changing the original program to be executable for an input/output environment of the particular processor as the actual executing input/output environment when it is determined that a set executing input/output environment of the original environment is different from an input/output environment of said particular processor.

18. The distributed processing system according to claim 15, wherein said changing means includes means for changing the original program to utilize an alternative environment of said particular processor as the executing environment when it is determined that the set executing environment is not present in said distributed processing system.

19. The distributed processing system according to claim 15, wherein said changing means includes means for changing the original program to utilize an alternative input/output environment of the particular processor as executing input/output environment when it is determined that the set executing environment of the original program is not present in said distributed processing system.

20. The distributed processing system according to claim 15, wherein said checking means includes means for autonomously checking whether or not the actual or alternative executing environment of the changed program matches to the executing environment of said particular processor.

21. The distributed processing system according to claim 15, wherein the means for changing comprises means for reducing the executing environment of said particular processor including reducing repetitive computations to match memory capabilities of the processor.

* * * * *